J. CHASE.
PRUNING IMPLEMENT.

No. 189,921. Patented April 24, 1877.

Witnesses.
F. Hunnewell.
W. E. Boardman.

Inventor.
Jefferson Chase.
F. Curtis. Atty.

UNITED STATES PATENT OFFICE.

JEFFERSON CHASE, OF ORANGE, MASSACHUSETTS.

IMPROVEMENT IN PRUNING IMPLEMENTS.

Specification forming part of Letters Patent No. 189,921, dated April 24, 1877; application filed February 17, 1877.

*To all whom it may concern:*

Be it known that I, JEFFERSON CHASE, of Orange, Franklin county, Massachusetts, have invented new and useful Improvements in Shears, of which the following is a specification:

The purpose of my present improvement is to provide a pivot for the blades of shears which shall wear, and maintain the original position of the blades with respect to each other, for an indefinite length of time; and the improvement consists in the employment of a tube or sleeve which encompasses the ordinary pivot, as hereinafter more fully described and definitely claimed.

Figure 1:
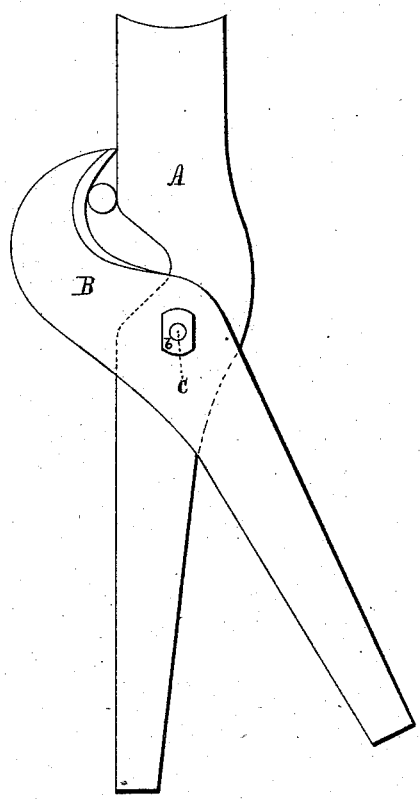
Figure 2:
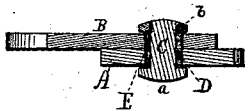

The drawings accompanying this specification represent, in Figure 1, a longitudinal section, and in Fig. 2 a cross-section of a pair of shears containing my improvement.

In such drawings, A and B represent the two blades of a pair of pruning-shears, and C the rivet or bolt which secures the two blades together.

In carrying out my improvement I introduce a sleeve or tube, D, which encompasses the rivet C, and enters enlarged holes E in the blades A B, and I prefer to harden the tube D in order to prolong its wear.

The head $a$ of the rivet or bolt C bears upon one end of the sleeve or tubular pivot D, and the nut $b$ of the said rivet screws down upon the opposite end of such pivot, and it will thus be seen that the sleeve D constitutes the real pivot of the two blades, while the bolt or rivet C performs the office of confining the whole together.

The length of the sleeve D is to be such that the two blades A B shall have the requisite freedom of motion, and when this length has been properly determined the blades will maintain their original relative positions for an indefinite length of time without further adjustment, as no perceptible wear upon the pivot will ensue.

The nut $b$ can be screwed upon the bolt or rivet with great power, so that it will remain fast under all circumstances and yet permit of easy movement of the blades.

I claim—

The auxiliary sleeve or tubular pivot D, in combination with the rivet or bolt C and blades A B, substantially as and for purposes stated.

JEFFERSON CHASE.

Witnesses:
F. HUNNEWELL,
W. E. BOARDMAN.